(12) United States Patent
Luling et al.

(10) Patent No.: US 12,066,589 B2
(45) Date of Patent: Aug. 20, 2024

(54) SYSTEM AND METHOD FOR CHARACTERIZING SUBTERRANEAN FORMATIONS

(71) Applicant: Schlumberger Technology Corporation, Sugar Land, TX (US)

(72) Inventors: Martin G. Luling, Paris (FR); Peter Schlicht, Romania (RO); Tianhua Zhang, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 15 days.

(21) Appl. No.: 17/759,399

(22) PCT Filed: Jan. 27, 2021

(86) PCT No.: PCT/US2021/015198
§ 371 (c)(1),
(2) Date: Jul. 25, 2022

(87) PCT Pub. No.: WO2021/154797
PCT Pub. Date: Aug. 5, 2021

(65) Prior Publication Data
US 2022/0381937 A1    Dec. 1, 2022

Related U.S. Application Data (60) Provisional application No. 62/966,646, filed on Jan. 28, 2020.

(51) Int. Cl.
*G01V 3/00*    (2006.01)
*E21B 47/002*    (2012.01)
(Continued)

(52) U.S. Cl.
CPC .............. *G01V 3/24* (2013.01); *E21B 47/002* (2020.05); *E21B 49/00* (2013.01); *G01V 3/38* (2013.01)

(58) Field of Classification Search
None
See application file for complete search history.

(56) References Cited

U.S. PATENT DOCUMENTS

| 3,816,811 A | 6/1974 | Cmelik |
| 3,879,644 A | 4/1975 | Maltby |

(Continued)

OTHER PUBLICATIONS

Substantive Exam issued in Saudi Arabia Patent Application No. 522433408 dated Apr. 22, 2023, 10 pages with English translation.
(Continued)

*Primary Examiner* — Thang X Le
(74) *Attorney, Agent, or Firm* — Michael Flynn (57) ABSTRACT

Systems and methods for imaging properties of subterranean formations (136) in a wellbore (106) include a formation sensor (120, 200) for collecting currents (304A, 304B) injected into the subterranean formations (139) and a formation imaging unit (118). The formation imaging unit (118) includes a current management unit for collecting data from the currents injected into the subterranean formations (136) and a formation data unit (116) for determining at least one formation parameter from the collected data. The formation imaging unit (118) also includes an inversion unit for determining at least one formation property by inverting the at least one formation parameter. The inversion unit is suitable for generating an inverted standoff image and an inverted permittivity image for comparison with a composite image of the formation imaging unit.

17 Claims, 6 Drawing Sheets

1200

1202 — Deploying a downhole tool into the wellbore

1204 — Collecting formation data from a plurality of currents sent through the at least one subterranean formations, the plurality of currents having at least two varying high frequencies 1206 — Inverting at least a portion of the formation data with a formation imaging unit 1208 — Determining at least one formation property with the formation imaging unit (51) Int. Cl.
*E21B 49/00* (2006.01)
*G01V 3/24* (2006.01)
*G01V 3/38* (2006.01)

(56) References Cited

U.S. PATENT DOCUMENTS

| | | | |
|---|---|---|---|
| 4,567,759 | A | 2/1986 | Ekstrom |
| 4,608,983 | A | 9/1986 | Muller |
| 4,899,112 | A | 2/1990 | Clark et al. |
| 5,345,179 | A | 9/1994 | Habashy |
| 5,457,396 | A | 10/1995 | Mori |
| 5,574,371 | A | 11/1996 | Tabanou |
| 5,677,631 | A | 10/1997 | Reittinger |
| 6,191,588 | B1 | 2/2001 | Chen |
| 6,527,923 | B2 | 3/2003 | Kirk |
| 6,801,039 | B2 | 10/2004 | Fabris |
| 7,066,282 | B2 | 6/2006 | Chen |
| 7,258,005 | B2 | 8/2007 | Nyce |
| 7,394,258 | B2 | 7/2008 | Itskovich |
| 7,397,250 | B2 | 7/2008 | Bespalov |
| 7,689,363 | B2 | 3/2010 | Itskovich |
| 8,893,782 | B2 | 11/2014 | Cheung |
| 8,901,932 | B2 | 12/2014 | Hayman |
| 9,360,444 | B2 | 6/2016 | Meignant |
| 10,502,859 | B2 | 12/2019 | Legendre |
| 2008/0288171 | A1 | 11/2008 | Itskovich |
| 2009/0072833 | A1 | 3/2009 | Tabarovsky |
| 2009/0090176 | A1 | 4/2009 | Toribio |
| 2009/0153155 | A1 | 6/2009 | Chambon |
| 2009/0204346 | A1 | 8/2009 | Xie |
| 2012/0119744 | A1 | 5/2012 | Habashy |
| 2012/0209527 | A1 | 8/2012 | Gorek |
| 2014/0191762 | A1 | 7/2014 | Chen et al. |
| 2015/0260874 | A1* | 9/2015 | Chen ........................ G01V 3/24 324/338 |
| 2017/0160421 | A1* | 6/2017 | Zhang ...................... G01V 3/24 |
| 2017/0275982 | A1* | 9/2017 | Peyaud .................. E21B 47/002 |
| 2021/0048554 | A1* | 2/2021 | Guner ...................... G01V 3/20 |
| 2021/0055449 | A1* | 2/2021 | Guner ...................... G01V 3/24 |

OTHER PUBLICATIONS

Al-Mutwali, O. et al., A New Laboratory SCAL Device and Processing Method for OBM Vug Density Quantification, SPE-183680-MS, presented at the SPE Middle East Oil & Gas Show and Conference, Manama, Kingdom of Bahrain, 2017, 20 pages.

Dielectric Constant of Common Materials downloaded on Sep. 26, 2022 at [https://www.kabusa.com/Dilectric-Constants.pdf], 52 pages.

Search Report and Written Opinion of International Patent Application No. PCT/US2021/015198 dated May 14, 201, 17 pages.

International Preliminary Report on Patentability of International Patent Application No. PCT/US2021/015198 dated Aug. 11, 2022, 11 pages.

Clark et al., "A Dual-Depth Resistivity Measurement for FEWD", SPWLA 28th Annual Logging Sympo-sium, San Antonio, Jun. 1988, paper A.(25 pages).

Wu et al., "Di-electric-Independent 2 MHz Propagation Resistivities", SPE-56448, 1999, Presentation at 1999 SPE Annual Technical Conference and Exhibition held in Houston, TX, Oct. 3-6, 1999 (19 pages).

Ekstrom et al., 1987, Formation Imaging with Microelectrical Scanning Arrays, the Log Analyst, May-Jun. 1987 (13 pages).

Habashy et al., 2004, A General Framework for Constraint Minimization for the Inversion of Electromagnetic Measurements, Progress in Electromagnetics Research, 2004, PIER 46, 265-312.

Chen et al., Inversion-Based Workflow for Quantitative Interpretation of the New-Generation Oil-Based Mud Resistivity Imager, SPWLA 55th Annual Logging Symposium, May 18-22, 2014 (35 pages).

Second Substantive Exam issued in Saudi Arabia Patent Application No. 522433408 dated Dec. 17, 2023, 14 pages with English translation.

* cited by examiner

SYSTEM AND METHOD FOR CHARACTERIZING SUBTERRANEAN FORMATIONS

CROSS-REFERENCE TO RELATED APPLICATION

The present document is based on and claims priority to U.S. Provisional Application Ser. No. 62/966,646, filed Jan. 28, 2020, which is incorporated herein by reference in its entirety.

TECHNICAL FIELD

The present invention relates to techniques for performing wellbore operations. More particularly, the present invention relates to techniques for determining characteristics of subterranean formations.

BACKGROUND

Oil rigs are positioned at wellsites for performing a variety of oilfield operations, such as drilling a wellbore, performing downhole testing and producing located hydrocarbons. Downhole drilling tools are advanced into the earth from a surface rig to form a wellbore. Drilling muds are often pumped into the wellbore as the drilling tool advances into the earth. The drilling muds may be used, for example, to remove cuttings, to cool a drill bit at the end of the drilling tool and/or to provide a protective lining along a wall of the wellbore. During or after drilling, casing is typically cemented into place to line at least a portion of the wellbore. Once the wellbore is formed, production tools may be positioned about the wellbore to draw fluids to the surface.

During drilling, measurements are often taken to determine downhole conditions. In some cases, the drilling tool may be removed so that a wireline testing tool may be lowered into the wellbore to take additional measurements and/or to sample downhole fluids. Once the drilling operation is complete, production equipment may be lowered into the wellbore to assist in drawing the hydrocarbons from a subsurface reservoir to the surface.

The downhole measurements taken by the drilling, testing, production and/or other wellsite tools may be used to determine downhole conditions and/or to assist in locating subsurface reservoirs containing valuable hydrocarbons. Such wellsite tools may be used to measure downhole parameters, such as temperature, pressure, viscosity, resistivity, etc. Such measurements may be useful in directing the oilfield operations and/or for analyzing downhole conditions.

Attempts have been made to identify geological features based on electromagnetic measurements. However, even though existing resistivity images enable to identify and delineate fractures in a subterranean formation, it would desirable to obtain additional information on the formation, such as information on fracture type (ie whether fractures are open or closed) from the electromagnetic measurements.

SUMMARY OF THE DISCLOSURE

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosure relates to a method for determining properties of at least one subterranean formation in a wellbore at a wellsite and comprises deploying a downhole tool into the wellbore having a wall, the downhole tool having a formation sensor thereon; collecting at least two currents sent through the at least one subterranean formation from the formation sensor; and performing an inversion at the formation imaging unit based on formation data determined from the at least two currents. Performing the inversion comprises generating an image of at least a first parameter relative to resistivity of the formation and of at least a second parameter relative to dielectric permittivity of the formation. The method also includes identifying a fracture of the wall of the wellbore and determining a type of the fracture using the images of the first and second parameters.

The disclosure also relates to a method for determining properties of at least one subterranean formation in a wellbore at a wellsite. The method comprises deploying a downhole tool into the wellbore having a wall, the downhole tool having a formation sensor thereon; and collecting at least two currents sent through the at least one subterranean formation from the formation sensor. The method also includes performing an inversion at the formation imaging unit based on formation data determined from the at least two currents. Performing the inversion comprises generating an image of at least a first parameter relative to resistivity of the formation and of at least a second parameter relative to dielectric permittivity of the formation. The method also includes identifying a material of the wall of the wellbore based at least on the second parameter on at least a predetermined location.

The disclosure also relates to a system for determining properties of at least one subterranean formation in a wellbore at a wellsite comprising a downhole tool having a formation sensor thereon, wherein the formation sensor is configured to collect two currents sent through the at least one subterranean formation and to determine formation data from the at least two currents; and a formation imaging unit configured to perform an inversion based on formation data determined from the at least two currents. Performing the inversion comprises generating an image of at least a first parameter relative to resistivity of the formation and of at least a second parameter relative to dielectric permittivity of the formation. The formation imaging unit is also configured to identify a fracture of the wall of the wellbore and determining a type of the fracture using the images of the first and second parameters.

Various refinements of the features noted above may exist in relation to various aspects of the present embodiments. Further features may also be incorporated in these various aspects. These refinements and additional features may exist individually or in any combination. For instance, various features discussed below in relation to the illustrated embodiments may be incorporated into any of the above-described aspects of the present disclosure alone or in any combination. Again, the brief summary presented above is intended to familiarize the reader with certain aspects and contexts of some embodiments without limitation to the claimed subject matter.

BRIEF DESCRIPTION OF THE DRAWINGS

The present embodiments may be better understood, and numerous objects, features, and advantages made apparent to those skilled in the art by referencing the accompanying drawings. These drawings are used to illustrate only typical embodiments of this invention, and are not to be considered limiting of its scope, as the invention may admit to other equally effective embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details. Presently preferred embodiments of the invention are shown in the above-identified Figures and described in detail below.

Figure 1:
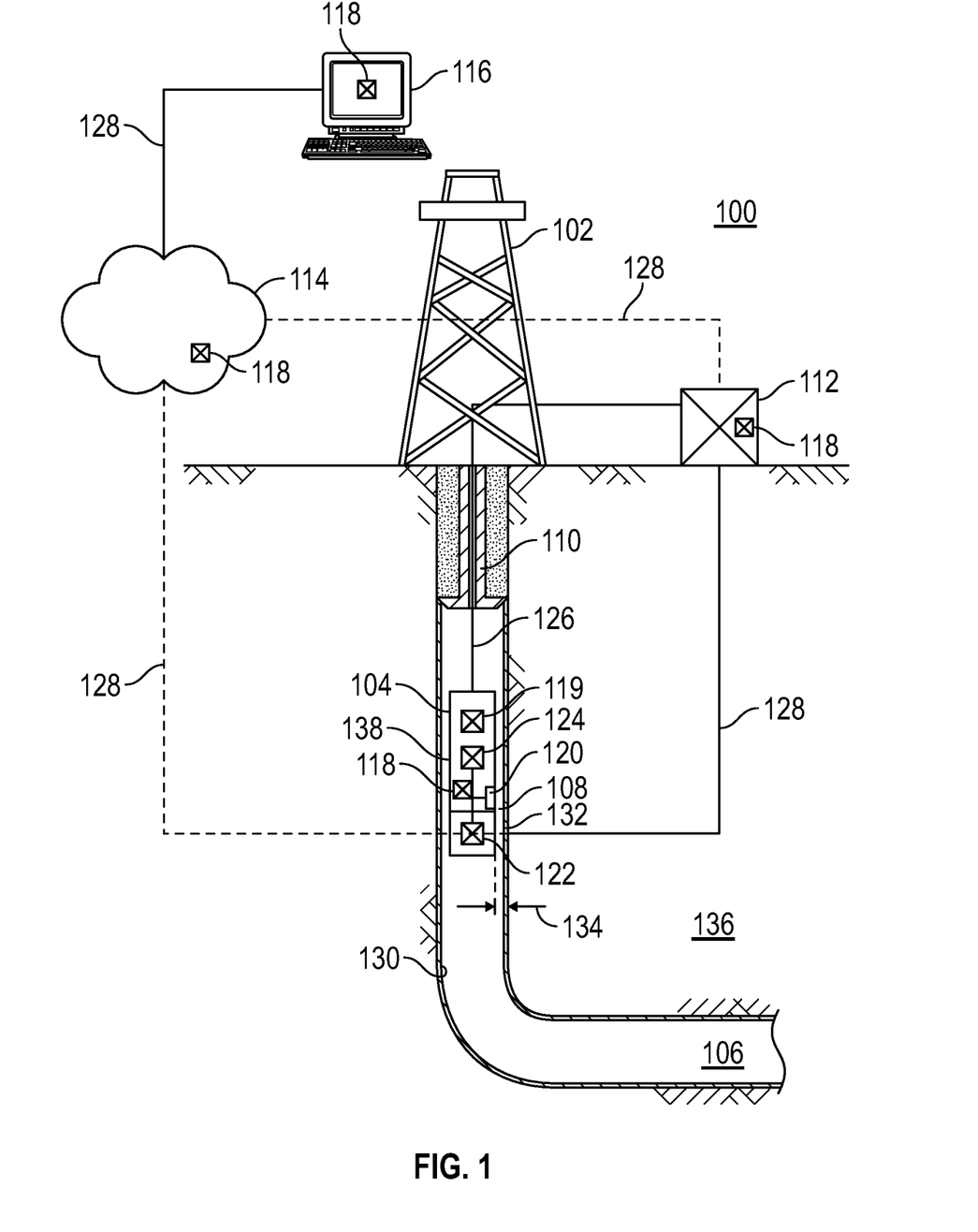
FIG. 1 is a schematic view of a system for imaging properties of one or more subterranean formations having a downhole tool deployable into a wellbore, in accordance with embodiments of the present disclosure.

FIG. 1 is a schematic view of a wellsite 100 having an oil rig 102 with a downhole tool 104 suspended into a wellbore 106. The wellbore 106 has been drilled by a drilling tool (not shown). A drilling mud, and/or a wellbore fluid 108, may have been pumped into the wellbore 106 and may line a wall thereof. As shown, a casing 110 has also been positioned in the wellbore 106 and cemented into place therein. The downhole tool 104 may have one or more sensors for determining one or more downhole parameters, such as wellbore fluid parameters and/or formation parameters. The downhole tool 104 may communicate with a controller 112, a communication network 114 and/or one or more offsite computers 116. The downhole tool 104, the controller 112, the communication network 114 and/or the offsite computers 116 may have a formation imaging unit 118. The fluid parameters and/or the formation parameters sensed by the downhole tool 104 may be sent to the formation imaging unit 118 to determine formation properties and/or to optimize a well plan at the wellsite 100. The term "imaging" as used herein, is a common term in the geophysics and oilfield art to refer to a representation that depicts an array of localized properties of a wellbore in two or more dimensions.

The downhole tool 104 is shown as a wireline logging tool lowered into the wellbore 106 to take various measurements. The downhole tool 104 may include a conventional logging device 119, one or more sensors 120, one or more telemetry devices 122, and an electronics package 124. The conventional logging device 119 may be provided with various sensors, measurement devices, communication devices, sampling devices and/or other devices for performing wellbore operations. For example, as the downhole tool 104 is lowered, it may use devices, such as resistivity or other logging devices, to measure formation parameters and/or downhole fluid parameters. The formation parameters and/or the downhole fluid parameters may be the collected data regarding the formation and/or the downhole fluid. The formation imaging unit 118 may manipulate the formation parameters and optionally the downhole fluid parameters to determine formation properties and/or downhole fluid properties for example resistivity.

As shown, the downhole tool 104 may be conveyed into the wellbore 106 on a wireline 126. Although the downhole tool 104 is shown as being conveyed into the wellbore 106 on a wireline 126, it should be appreciated that any suitable conveyance may be used, such as a slick line, a coiled tubing, a drill string, a casing string and the like. The downhole tool 104 may be operatively connected to the controller 112 for communication between the tool 104 and the controller 112. The downhole tool 104 may be wired via the wireline 126, as shown, and/or wirelessly linked via the one or more telemetry devices 122. The one or more telemetry devices 122 may include any telemetry devices, such as electromagnetic devices, for passing signals to the controller 112 as indicated by communication links 128. Further, it should be appreciated that any communication device or system may be used to communicate between the downhole tool 104 and the controller 112. Signals may be passed between the downhole tool 104, the controller 112, the communication network 114, and/or the offsite computer(s) 116 and/or other locations for communication between these devices.

While the downhole tool 104 is depicted as the wireline tool having the one or more sensors 120 thereon, it will be appreciated that the one or more sensors 120 may be positioned downhole in a variety of arrangements and/or on a variety of one or more tools. For example, the one or more sensors 120 may be arranged in a pad suitable for being positioned across from the formation in the wellbore 106. The one or more sensors 120 (or a pad on which the sensors 120 are arranged) may also placed on any downhole system and/or tool for example, on a wireline logging tool, a drilling string, a logging while drilling tool (LWD), a measurement while drilling tool (MWD), a coiled tubing, a drill stem tester, a production tubing, a casing, a pipe, or any other suitable downhole tool. Although only one of the one or more sensors 120 is shown, it should be appreciated that one or more sensors 120 and/or portions of the one or more sensors 120 may be located at several locations in the wellbore 106. In some embodiments, the one or more sensors 120 may be positioned about an outer surface of the downhole tool 104 so that the wellbore fluid 108 may pass over or along the sensors 120. In some embodiments, the one or more sensors 120 may also be positioned at various locations about the wellsite 100 to perform fluid and/or formation measurements.

The electronics package 124 may include any components and/or devices suitable for operating, monitoring, powering, calculating, calibrating, and analyzing components of the downhole tool 104. Thus, the electronics package 124 may include a power source, a processor, a storage device, a signal conversion (digitizer, mixer, amplifier, etc.), a signal switching device (switch, multiplexer, etc.), a receiver device and/or a transmission device, and the like. The electronics package 124 may be operatively coupled to the one or more sensors 120 and/or the formation imaging unit 118. The power source may be supplied by the wireline 126.

Further, the power source may be in the electronics package 124. The power source may apply multiple currents to the one or more sensors 120. The power source may be provided by a battery power supply or other conventional means of providing power. In some cases, the power source may be an existing power source used in the downhole tool 104. The power source may be positioned, for example, in the downhole tool 104 and wired to the one or more sensors 120 for providing power thereto as shown. Optionally, the power source may be provided for use with the one or more sensors 120 and/or other downhole devices. Although the electronics package 124 is shown as one separate unit from the one or more sensors 120 and/or the formation imaging unit 118, it should be appreciated that any portion of the electronics package 124 may be included within the one or more sensors 120 and/or the formation imaging unit 118. Further, the components of the electronics package 124 may be located at various locations about the downhole tool 104, the controller 112 and/or the wellsite 100. The one or more sensors 120 may also be wired or wirelessly connected to any of the features of the downhole tool 104, the formation imaging unit 118, the communication network 114, and/or the controller 112, such as communication links, processors, power sources and/or other features thereof.

The downhole fluid 108, or wellbore fluid, or borehole mud fluid, used at the wellsite 100 may be an oil-based mud. The downhole fluid 108 may be pumped into the wellbore 106 during drilling and/or other downhole operations. The downhole fluid 108 may coat a wellbore wall 130 as it encounters the wellbore wall 130. The downhole fluid 108 coated on the wellbore wall 130 may form a mud column 132, or mud standoff. The mud column 132 may refer to mud and/or borehole fluid between the one or more sensors 120 and the borehole wall and may occupy a gap 134, or standoff, or mud standoff, or sensor standoff, between the one or more sensors 120 and a subterranean formation 136. Further roughness of the wellbore wall 130 may cause the gap 134, or standoff, or sensor standoff, between the one or more sensors 120 and the subterranean formation 136. The oil-based mud may have a high resistivity. For example, the resistivity of a water-based mud may be between 0.01-20 Ohm and the resistivity for the oil-based mud may be 1,000 to 10,000,000 times higher than the water-based mud. Due to the high resistivity of the oil-based mud, the properties of the oil-based mud must be accounted for when determining formation properties, as will be discussed in more detail below. Because the same wellbore fluid 108, or mud, is typically used during wellsite operation, the properties of the downhole fluid 108 may remain relatively constant along the length of the wellbore 106.

The one or more sensors 120 may be capable of determining one or more downhole fluid parameters and/or one or more formation parameters. The one or more sensors 120 may determine the downhole parameters of the downhole fluids 108 and/or the subterranean formations 136 as the downhole tool 104 passes through the wellbore 106. As shown, the one or more sensors 120 may be positioned on an outer surface 138 of the downhole tool 104. A portion of the one or more sensors 120 may be recessed a distance below the outer surface 138 to provide additional protection thereto, or protruded a distance therefrom to access fluid and/or subterranean formation 136. The one or more sensors 120 may also be positioned at various angles and locations as desired.

Figure 2:
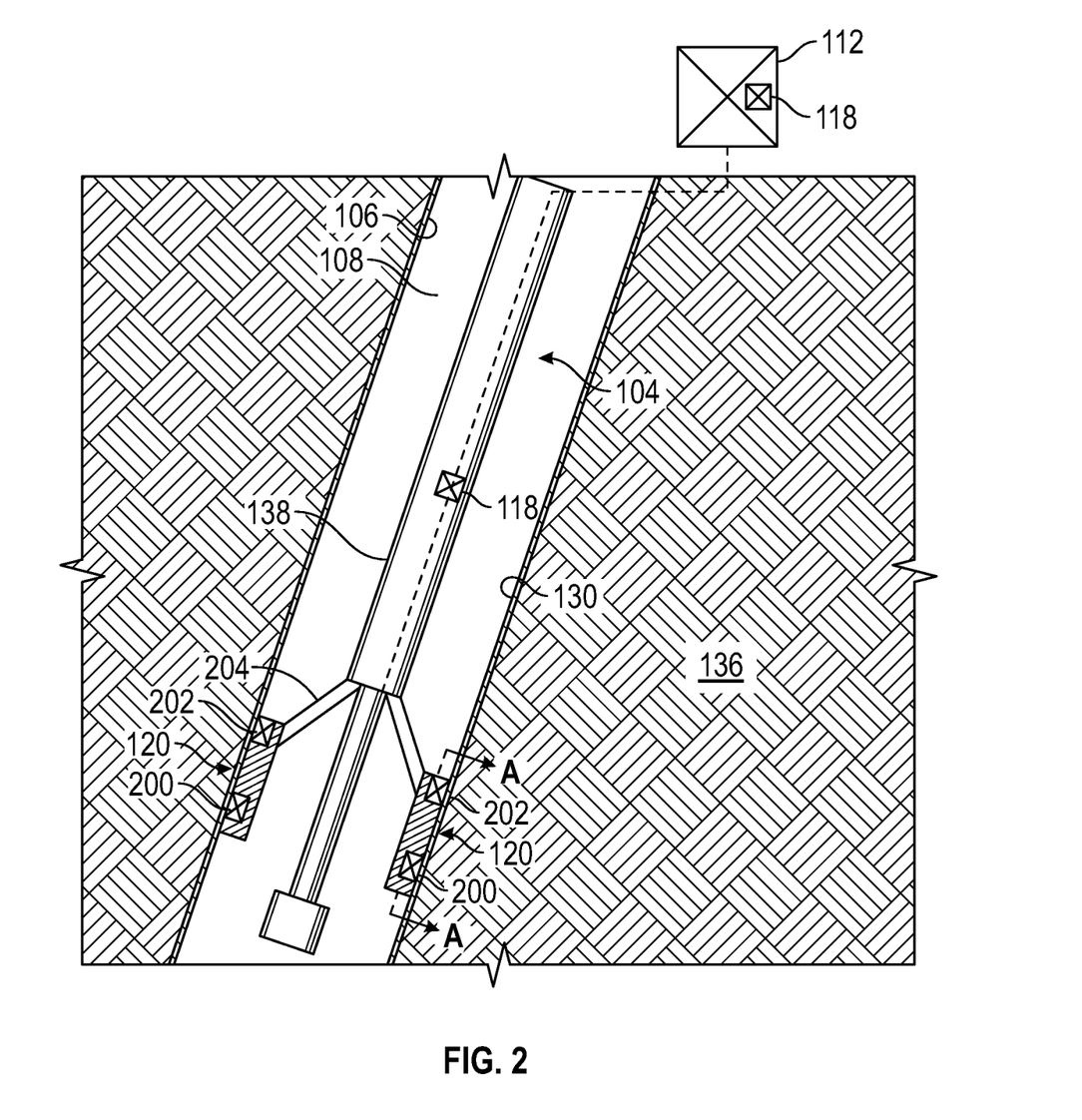
FIG. 2 is a schematic view of the downhole tool of FIG. 1 depicting the downhole tool with a sensor pad having a formation sensor thereon, in accordance with embodiments of the present disclosure.

FIG. 2 shows a schematic view of the downhole tool 104 located in the wellbore 106 and within the subterranean formation 136. As depicted, the downhole tool 104 is a wireline microresistivity tool containing the one or more sensors 120 with a formation sensor 200 and optionally a mud sensor 202. The one or more sensors 120 may be located on the outer surface 138, or located on one or more arms 204 which extend from downhole tool 104. The one or more arms 204 may be configured to place the one or more sensors 120 as close to the wellbore wall 130, or against the mud column 132 on the wellbore wall 130, as possible. The one or more arms 204 may be actuatable, or spring loaded in order to locate the one or more sensors 120 against the wellbore wall 130.

The formation sensor 200 may be any sensor configured to determine one or more formation parameters. The formation sensor 200 may send, or inject, a plurality of currents through a portion of the subterranean formation 136 between two electrodes. The plurality of currents may have two or more frequencies, as will be discussed in more detail below. The plurality of currents may pass through the downhole fluid 108 and the subterranean formation 136. The injected current may include information regarding formation and/or fluid parameters. The current detected by the formation sensor 200 may be sent to the formation imaging unit 118. The formation and/or fluid parameters may be processed by the formation imaging unit 118 to determine one or more formation properties, as will be discussed in more detail below. When the downhole fluid 108 is the oil-based drilling mud, the impedance contribution from the mud column 132 may be significantly larger than the impedance contribution from the formation 136.

The mud sensor 202 may be an optional sensor configured to determine one or more downhole fluid parameters. The mud sensor 202 may be configured to send, or inject, current through the downhole fluid 108 and/or the mud column 132. The current injected and detected by the mud sensor 202 may have the same frequencies as the plurality of currents injected by the formation sensor 200. The current detected by the mud sensor 202 may be sent to the formation imaging unit 118.

Figure 3:
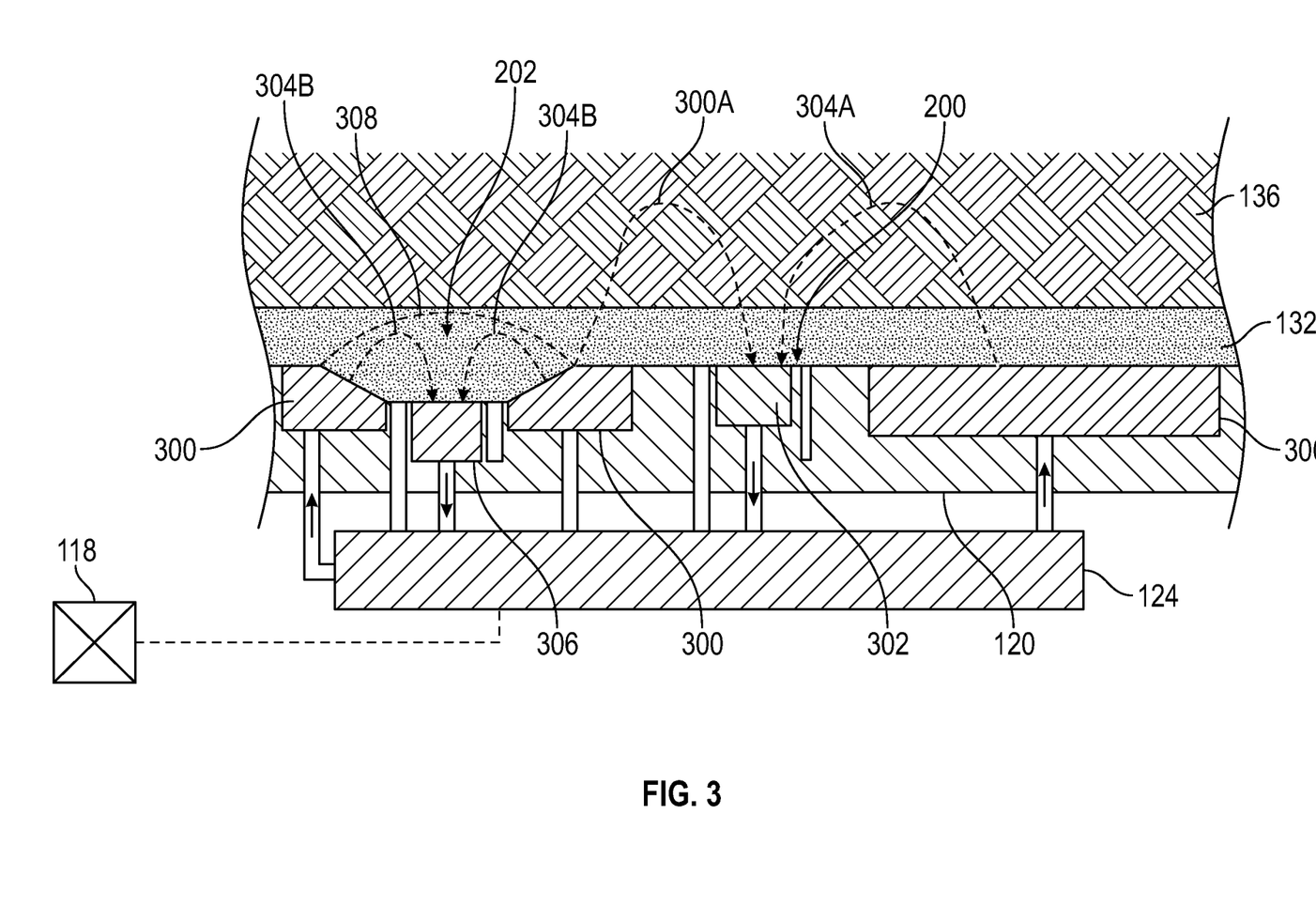
FIG. 3 is a longitudinal cross-sectional view of the sensor pad of FIG. 2 taken along line A-A depicting the formation sensor on a face of the sensor pad, in accordance with embodiments of the present disclosure.

FIG. 3 depicts a cross sectional view of the sensor pad 120 of FIG. 2 having the formation sensor 200 and the mud sensor 202. As shown, the formation sensor 200 may have one or more source electrodes 300 and one or more return electrode 302 connected to the electronics package 124. The electronics package 124 may send a plurality of currents 304A to the source electrode 300. The plurality of currents 304A may travel through the mud column 132, through the subterranean formation 136 and into the return electrode 302. The return electrode 302 may send the collected plurality of currents 304A to the electronics package 124 and/or the formation imaging unit 118.

The sensor pad 120 may optionally have the mud sensor 202. The mud sensor 202 may be configured to send a plurality of currents 304B through the mud column 132 and/or the downhole fluid 108 (as shown in FIG. 1). By sending the plurality of currents 304B through the mud column 132 and/or downhole fluid 108 only, the downhole fluid parameters may be determined. The mud sensor 202 may have the one or more source electrodes 300 and a mud return electrode 306. The electronics package 124 may send the plurality of currents 304B to the mud sensor 202, and source electrodes 300. The mud sensor 202, as shown, has a recessed configuration. The recessed configuration may be configured to pass the plurality of currents 304B through a fluid zone 308. The mud return electrode 306 may send the collected plurality of currents 304B to the electronics package 124 and/or the formation imaging unit 118.

Figure 4:
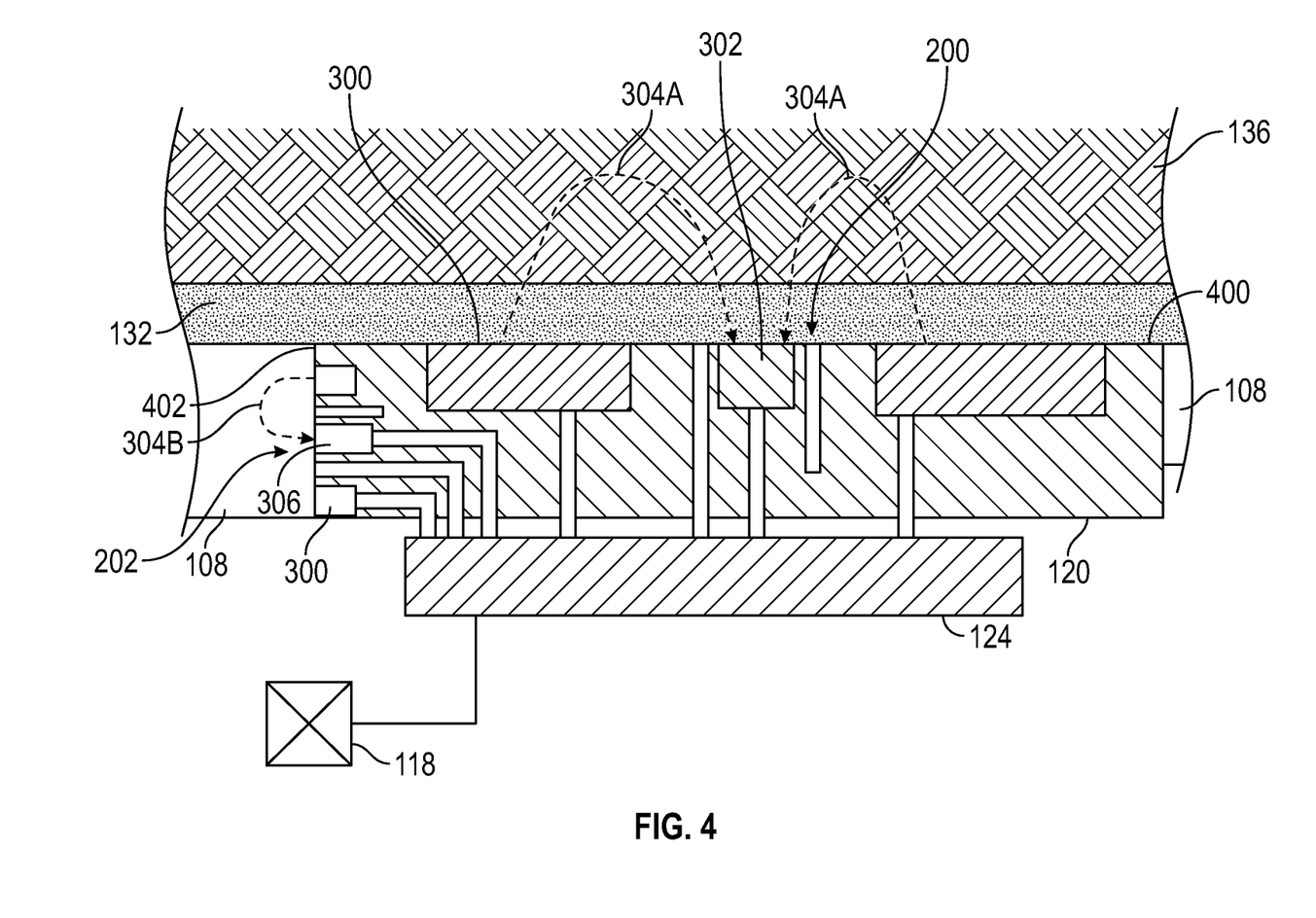
FIG. 4 is a longitudinal cross-sectional view of an alternate sensor pad of FIG. 3, in accordance with embodiments of the present disclosure.

FIG. 4 depicts a cross sectional view of an alternated sensor pad 120 of FIG. 2 having the formation sensor 200 and the mud sensor 202. The formation sensor 200, as shown, may be located proximate a face 400 of the pad in a similar manner as shown in FIG. 3. In some embodiments, the mud sensor 202 may be located on a side surface 402 of the sensor pad 120. Locating the mud sensor 202 on the side surface 402 may allow the plurality of currents 304B sent from the source electrodes 300 to the mud return electrode 306 to pass only through the downhole fluid 108. In a similar manner, as described herein, the return electrode 302 and the mud return electrode 306 may send the collected plurality of currents 304A and/or 304B to the electronics package 124 and/or the formation imaging unit 118. Although the mud sensor 202 is shown as being a recessed sensor, or a sensor on the side surface 402 of the sensor pad 120, it should be appreciated that the mud sensor 202 may be any suitable sensor for determining the downhole fluid parameters. The mud sensor 202 may also pass the plurality of current 304B through the formation 136. Further, the formation sensor 200 may be any suitable sensor for determining formation and/or downhole fluid parameters.

The plurality of currents 304A and/or 304B may be high frequency current in order to penetrate the highly resistive oil-based mud. Due to the high frequency of the plurality of currents 304A and/or 304B, the source electrodes 300 and the return electrode 302 and/or the mud return electrode 306 may be located in close proximity to one another, as shown in FIGS. 3 and 4. The frequency range of the formation sensor 200 and/or the mud sensor 202 may be optimized in a frequency range from a few hundred kHz up to roughly 100 MHz. Due to the frequency, the formation sensor 200 and/or the mud sensor 202 may be adapted to the full range of oil-based-mud micro-resistivity imaging tools such as OBMI, as shown in U.S. Pat. No. 6,191,588, which is herein incorporated by reference in its entirety. Thus, the downhole tool 104 (as shown in FIG. 1) may measure the downhole fluid 108 at the same, or similar, frequency or frequencies as the subterranean formation 136.

The source electrodes 300, the return electrodes 302, and the mud return electrode 306 may be any conventional electrode capable of generating the plurality of currents 304A and/or 304B across the oil-based mud, or downhole fluid 108. A power source (e.g., included in the electronics package 124 of FIG. 1) may be operatively connected to the source and return electrodes 300/302 for applying a voltage (V+, V−) thereacross. As voltage is applied, a plurality of currents 304A/304B that may flow out of one of the electrodes 300/302, for example the source electrodes 300 that can be measured by the return electrodes 302 and/or the mud return electrode 306. The source electrodes 300 and the sensor electrodes may be geometrically and materially optimized to match substantially to a fixed characteristic impedance transmission line.

The current from the electrodes may be used to determine various parameters. In an example involving a fluid passing between a pair of electrodes, an AC voltage V is applied between two electrodes to generate a resultant current I that can be measured at the sensor electrode, for example the return electrode 302 or the mud return electrode 306. The complex impedance Z may be determined from the measured current I based on the following:

$$z = |z| \exp(i\phi_z) \qquad \text{Equation (1)}$$

where its magnitude |z| based on Ohms law and phase $\phi_z$ are defined as follows:

$$\phi_z = |V/I| \qquad \text{Equation (2)}$$

$$\phi_z = \text{phase of } I \text{ relative } V \qquad \text{Equation (3)}$$

and where exp $(i\phi_z)$ based on Euler's formula is defined as follows:

$$\exp(i\phi_z) = \cos\phi_z + i\sin\phi_z \qquad \text{Equation (4)}$$

The magnitude and phase of the impedivity (sometimes referred to as the complex impedivity) of the rock $\zeta$ is defined as follows:

$$\zeta = |\zeta| \exp(i\phi_\zeta) \qquad \text{Equation (5)}$$

Equation (5) may be derived from z when the rock is measured by the sensor 202 by the relations as follows:

$$|\zeta| = k|z| \qquad \text{Equation (6)}$$

Equation (6) may also be written as follows:

$$|\zeta| = k|V|/|I| \qquad \text{Equation (7)}$$

The phase (or dielectric angle) of the rock $\zeta$ is derived as follows:

$$\phi_\zeta = \phi_z \qquad \text{Equation (8)}$$

where:
  $|\zeta|$ is the magnitude of impedivity,
  $\phi_\zeta$ is the phase angle of the impedivity, and
  k is a constant for the device.

The constant k may be measured empirically, for example, by measuring the impedance V/I between electrodes as a fluid of known impedivity. The constant k may also be calculated from the geometry of the electrodes using conventional methods.

Data concerning the measured current may be used to determine formation parameters, such as impedivity, resistivity, impedance, conductivity, complex conductivity, complex permittivity, tangent delta, and combinations thereof, as well as other parameters of the downhole fluid 108. The data may be analyzed to determine characteristics, or properties, of the wellbore fluid 108, such as the type of fluid (e.g., hydrocarbon, mud, contaminants, etc.) The formation imaging unit 118 may be used to analyze the data, as will be discussed in more detail below. Such analysis may be performed with other inputs, such as historical or measured data about this or other wellsites. Reports and/or other outputs may be generated from the data. The data may be used to make decisions and/or adjust operations at the wellsite. In some cases, the data may be fed back to the wellsite 100 for real-time decision making and/or operation.

The formation imaging unit 118 may be incorporated into or about the wellsite 100 (on or off site) for operation with the controller 112. The formation imaging unit 118 may determine, generate, and/or model various formation properties. For example, in some embodiments, the formation imaging unit 118 may use an inversion for borehole imaging with a multi-frequency approach. The formation imaging unit 118 may invert for a parameter relative to the formation resistivity, such as the formation impedivity or the formation resistivity (corresponding to the real part of the impedivity), a parameter relative to the formation dielectric permittivity, and optionally the mud standoff (distance between the downhole tool and the formation) to determine formation properties. The formation properties may be used to produce a formation model. Moreover, in some embodiments, the formation imaging unit 118 may be used to compare the inverted resistivity/impedivity image with the inverted standoff image, the inverted permittivity image, or both, to indicate an accuracy of the borehole imaging. For example, the formation imaging unit may output a composite image representative of the borehole formation. The comparison of the inverted images (e.g., inverted resistivity image with the inverted standoff image and/or inverted permittivity image) may provide a quality indicator for the quality and/or accuracy of the composite image.

The formation imaging unit 118 may take the form of an entirely hardware embodiment, an entirely software embodiment (including firmware, resident software, micro-code, etc.), or an embodiment combining software and hardware aspects. Embodiments may take the form of a computer program embodied in any medium having computer usable program code embodied in the medium. The embodiments may be provided as a computer program product, or software, that may include a machine-readable medium having stored thereon instructions, which may be used to program a computer system (or other electronic device(s)) to perform a process. A machine readable medium includes any mechanism for storing or transmitting information in a form (such as, software, processing application) readable by a machine (such as a computer). The machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Embodiments may further be embodied in an electrical, optical, acoustical or other form of propagated signal (e.g., carrier waves, infrared signals, digital signals, etc.), or wireline, wireless, or other communications medium. Further, it should be appreciated that the embodiments may take the form of hand calculations, and/or operator comparisons. To this end, the operator and/or engineer(s) may receive, manipulate, catalog and store the data from the downhole tool 104 in order to perform tasks depicted in the formation imaging unit 118.

The sensor and/or formation imaging unit may be configured to generate and collect the appropriate number and frequency of the plurality of currents 304A and/or 304B, depending on the wellbore 106 conditions and/or the type of sensor pad 120 used. The number of frequencies used may depend on the number of formation parameters and/or downhole fluid parameters to be calculated using the inversion unit 510. The number of currents and frequencies used may be dependent on the downhole fluid 108 (as shown in FIG. 1) being measured in-situ, or alternatively calculated using an inversion. In some embodiments, logging data may be inverted to provide inverted borehole images, including, for example, inverted resistivity images, inverted standoff images, and inverted permittivity images.

If the sensor 120, downhole tool 104 and/or a separate downhole tool (not shown) have the mud sensor 202 (as shown in FIGS. 2-4) then the number of the plurality of currents 304A sent into the formation may be minimized at two logging frequencies. If the mud sensor 202 is not present, the mud properties will be inverted for and will require the current management unit 504 to generate the plurality of currents 304A at a minimum of three logging frequencies. The number of logging frequencies used may increase to improve accuracy and/or as the number of unknowns in the downhole fluid and/or the formation increase, as will be described in more detail below.

The determined number of multiple logging frequencies may be sent into the formation at substantially the same time at multiple locations along the formation. The plurality of currents 304B for measuring the downhole fluid properties may have the same logging frequencies, or a portion of the logging frequencies, as those sent into the subterranean formation 136 (as shown in FIG. 1). A historical record of the current data may be kept for each logging location in the wellbore 106 (as shown in FIG. 1).

The sensor and/or formation analysis unit may be used to collect, catalog, store, manipulate and/or supply mud data. The mud data may be the measured data from the mud sensor 202 (as shown in FIG. 2). In some embodiments, the mud data may be obtained from the measured data from the formation sensor 200, when there is no separate mud sensor 202. If there is no separate mud sensor 202, the mud data may be inverted along with formation data to determine the downhole fluid properties, as will be discussed in more detail below. The measured mud data may be measured mud parameters, or mud electric parameters, that may be manipulated by the inversion unit 510 to determine mud and/or formation properties. The mud data, or mud parameters, may be mud impedance, permittivity, resistivity, loss tangent or other derived parameter and mud standoff. These mud data that are measured may be manipulated to determine mud properties such as mud permittivity, current amplitude, current phase, resistivity and conductivity. The downhole fluid properties typically do not change significantly in the wellbore 106. Therefore, it may only be necessary to measure or invert for the mud parameters periodically at a much lower sampling rate than obtaining the formation parameters. The borehole fluid parameters, or properties, may be determined by the one or more sensors independent of a determination of the formation parameters. Thus, the determined fluid parameters may be used to more accurately determine the formation parameters as will be described in more detail below.

The sensor and/or formation analysis unit may be used to collect, catalog, store, manipulate and/or supply formation data. In some embodiments, the formation data may be the measured data from the formation sensor 200 (as shown in FIG. 2). Because the plurality of currents 304A (as shown in FIGS. 3 and 4) may have data regarding the mud and the formation, the formation data may have to be manipulated in order to determine the formation parameters and/or formation properties. The formation data, or formation parameters, may be the measured parameters from the formation 136 such as formation impedance, amplitude and phase of the current, and the like. The formation data, or formation parameters, may be manipulated along with the mud data to determine formation properties such as impedivity, resistivity, conductivity, permittivity, and the like. The formation data may be obtained from the plurality of currents 304A (as shown in FIGS. 3 and 4) at the plurality of frequencies. The formation data may have current data from a plurality of locations along the wellbore 106.

To determine formation resistivity or impedivity or conductivity, or an inverted formation resistivity, the formation imaging unit may invert, or parametrically invert, the multiple current measurements made at several frequencies, as will be described in more detail below. The number of frequencies used may depend on the number of parameters to be inverted as explained above. The parameters to be inverted may be relative to the formation resistivity, the formation permittivity, and/or the mud standoff (if the mud data is collected independently of the formation data).

The plurality of currents 304A (as shown in FIGS. 3 and 4) may first pass through the mud column 132, or mud-standoff, then the formation. The impedance from the mud column 132 and the formation combined may be measured. The measured impedance may be given approximately as:

$$Z = V/I = K_{mud}\Delta \frac{R_{mud}}{1 + j\omega\varepsilon_0\varepsilon_{mud}R_{mud}} + K_{rock}\frac{R_{rock}}{1 + j\omega\varepsilon_0\varepsilon_{rock}R_{rock}} \quad \text{(Equation 9)}$$

Where $\Delta$ is the mud standoff, $K_{mud}$ and $K_{rock}$ are tool related coefficients, and $\omega$ is the operating frequency, or logging frequency for each of the plurality of currents 304A. $\varepsilon_{mud}$ and $\varepsilon_{rock}$ may be the relative permittivity of the mud and the formation respectively. $R_{mud}$ and $R_{rock}$ may be the resistivity of the mud and the formation respectively. The term $\varepsilon_0$ represents the dielectric permittivity of free space (a constant=$8.85419 \times 10^{-12}$ As/Vm) and j represents vi. The terms subscripted by "mud" represent the contribution to Z from the mud occupying the space between the face of the electrodes and the formation, depending of the electrical properties of the formation, the properties $\varepsilon_{rock}$ and $R_{rock}$ the contribution from the mud or mud column 132 may be significantly larger than the contribution from the formation.

In equation 9, the formation sensor 200 (as shown in FIGS. 2-4) current I may have independent components that are respectively in-phase and out-of-phase with the voltage V. These may be its real and imaginary parts real(I) and imag(I). Therefore, equation 9 may represent two independent equations:

$$\text{real}(V/I) = \Delta K_{mud}R_{mud}/[1+(\omega\varepsilon_0\varepsilon_{mud}R_{mud})^2] + K_{rock}R_{rock}/[1+(\omega\varepsilon_0\varepsilon_{rock}R_{rock})^2] \quad \text{(Equation 10)}$$

$$-\omega\varepsilon_0\{\Delta K_{mud}\varepsilon_{mud}R_{mud}^2/[1+(\omega\varepsilon_0\varepsilon_{mud}R_{mud})^2] + K_{rock}\varepsilon_{rock}R_{rock}^2/[1+(\omega\varepsilon_0\varepsilon_{rock}R_{rock})^2]\} \quad \text{(Equation 11)}$$

There may be five unknowns in these two equations $R_{rock}$, $\varepsilon_{rock}$, $R_{mud}$, $\varepsilon_{mud}$, and $\Delta$. $R_{rock}$ may be the property of interest that is used to create a formation model. Therefore, if three of these unknowns may be accounted for then $R_{rock}$ may be calculated.

The formation resistivity $R_{rock}$ and the mud standoff $\Delta$ may be frequency independent parameters. Therefore, these frequency independent parameters may correspond to two unknown parameters that are fixed at a particular logging point irrespective of the number of frequencies used. The formation permittivity $\varepsilon_{rock}$ may be frequency dependent. Thus, the number of formation permittivities $\varepsilon_{rock}$ to be inverted may be equal to the number of operating frequencies, or logging frequencies used. Alternatively, the inversion unit 510 may model the formation permittivity $\varepsilon_{rock}$ as a polynomial function of frequency or in terms of any other functional form. In some embodiments, a minimum number of coefficients may be used to describe the frequency dependence. The inversion unit 510 may then invert for the coefficients instead of the formation permittivity $\varepsilon_{rock}$. One example of an inversion may be given as follows:

$$\varepsilon_{rock} = A + B*f^C*R_{rock}^D \quad \text{(Equation 12)}$$

where A, B, C and D may be unknown coefficients which may be found by performing an inversion with the inversion unit 510. The number of coefficients may be fixed and therefore does not change with the number of logging frequencies used. Therefore, the number of unknowns due to the formation permittivity $F_{rock}$ may not increase with the number of frequencies if the coefficients are determined by inversion. Alternatively, in some embodiments, $R_{rock}$, $\varepsilon_{rock}$, or both, may be frequency dependent. The coefficients introduced to represent the frequency dependence can be inverted for by increasing the number of logging frequencies to make available a sufficiently large number of equations.

The downhole fluid properties, or mud properties, such as permittivity and conductivity, may also be frequency dependent, or function of the frequencies. The mud properties may be directly inverted for at each logging frequency. In some embodiments, the mud properties may also be expressed as a polynomial function of frequency or in any other functional form with a minimum number of coefficients. These coefficients may be determined by inversion using the inversion unit 510.

In some embodiments, to determine the unknown parameters, or formation and/or downhole fluid properties $R_{rock}$, $\varepsilon_{rock}$, $R_{mud}$, $\varepsilon_{mud}$, and $\Delta$, the inversion unit 510 may perform an inversion of the formation data and/or the mud data. The inversion may be an iterative process where estimates or guesses for the unknown properties $R_{rock}$, $\varepsilon_{rock}$, $R_{mud}$, $\varepsilon_{mud}$, and A are successively refined to reduce to a minimum the difference between the measured current values and corresponding values computed from a forward model, using as input the guessed values of the unknown parameters. In one example, equation 9 is the forward model. The functions $K_{mud}$ and $K_{rock}$ may be specific to a particular downhole tool 104 (as shown in FIG. 1). To make inversion feasible, a forward model such as equation 9 may be constructed that represents closely the behavior of the actual downhole tool. Any suitable method of representing the behavior of the downhole tool 104 may be used. For example, a finite element (FE) modeling may be used to compute the formation sensor current, and/or the mud sensor current, for a particular downhole tool 104. The FE model may take into account the geometry and frequency of the downhole tool, and the materials used in its construction. It may also take into account the position of the downhole tool relative to the wellbore wall 130 and/or the mud column 132, the size of the wellbore 106 and the materials inside and surrounding it. A large number of such FE simulations may be made to populate a representative volume of ($R_{rock}$, $\varepsilon_{rock}$, $R_{mud}$, $\varepsilon_{mud}$, and A) space, for the logging frequencies concerned. These numerical data may then be used to construct an analytic form, such as equation 9 with the analytic functions $K_{mud}$ and $K_{rock}$. Using this inversion process, the formation resistivity $R_{rock}$, or inverted formation resistivity, may be determined.

In the current disclosure, a particular electrical model of the measurement is described, enabling to characterize the impedance value, but other electrical models may be used depending on the configuration of the tool environment. Another exemplary model that can be used and resolved to obtain the parameters relative to resistivity and dielectric permittivity, and standoff, in particular for a logging-while-drilling tool, is an electrical model that is described in US patent publication numbered 10,502,859 herein incorporated by reference. Any other electrical model is also part of this disclosure. As mentioned above, the current may be sent through the formation at an appropriate number of frequencies to be able to solve the unknown parameters of the model.

The formation imaging unit 118 may construct a formation model from the formation properties obtained by the inversion unit 510. The formation model may be any suitable model for determining formation properties and/or the location of valuable downhole fluids such as hydrocarbons. The formation model may be constructed based on the formation resistivity $R_{rock}$. The formation model may be an approximate model, or may be replaced by a tool model derived using 3D modeling. The 3D model may be constructed using the data from the inversion unit 510, for example the multi-frequency parametric inversion, to obtain the formation resistivity from the measured impedance.

The formation model may be constructed with one or more layer boundaries using inverted formation properties from measurements taken at multiple logging points in the wellbore 106 (as shown in FIG. 1). Thus, the formation model may be a homogeneous formation model at each logging point in order to limit the number of model parameters. The homogeneous approach may lead to uncertainty at or near the formation boundaries where the medium is not homogeneous. Therefore, a multi-layer formation model may be constructed by the formation model unit 512 to represent the formation. For the multi-layered formation model more parameters may be inverted by the inversion unit 510. For example, each formation layer may have its resistivity, permittivity, boundary positions, layer dip, and/or layer azimuth inverted. The increased number of parameters to be inverted by the inversion unit 510 may require using measurements of multiple log points in the inversion.

Furthermore, in some embodiments, the inversion unit 510 may invert at multiple log points. Such a multipoint inversion strategy may assume that mud properties change relatively slowly and are relatively constant locally in a bore hole, while each individual log point has unique formation properties and standoff. Mud properties, as well as other less sensitive model parameters, may be approximated and/or estimated and applied over multiple log points.

Some embodiments may also account for the change of mud properties along depths of the borehole. A multistep inversion technique may involving periodically inverting mud properties after initial segmentation. In one embodiment, the mud properties may be inverted for a relatively short interval (e.g., approximately less than 10 ft long). The mud properties may then be used to invert the sensor standoff and formation properties for longer log sections (e.g., approximately 200 ft or longer). The inversion may be run in multiple passes, iteratively refining the mud properties. In some embodiments, multiple inversions may be run for the same inversion outputs, and the accuracy of inversion outputs may be determined based on a comparison of the outputs from the multiple inversions.

Mud properties may also compensate for imperfect measurement calibration. In some embodiments, different mud properties may be assumed for each button. An inversion of multiple buttons may be conducted simultaneously, using common mud properties for a pad or group of pads. The calibration amplitude and phase may be solved. After mud properties are calibrated, a more accurate mud angle may be used in a suitable processing scheme. In some embodiments, the mud angle variation may also be taken into account based on changes observed in conventional mud angle logs.

In some embodiments, the inverted resistivity images, inverted standoff images, and inverted permittivity images may be used alone or in combination to indicate various features of the wellbore 106 or the formation 136. For example, the standoff image may be an indicator of the borehole rugosity and fractures and may also be used to evaluate the geo-mechanics, stability, rock strength (e.g., fracture-ability) of the wellbore 106, as well as other borehole surface events, such as drilling-activated fault slips or side-wall coring positions. The inverted images may also be used in combination to provide further information. For example, the inverted standoff image may be compared with the inverted resistivity image to indicate the quality of the composite image, to diagnose imaging problems, to evaluate fractures and whether they are open or closed, and/or to indicate breakouts. In some embodiments, the inverted permittivity image may be compared with the inverted resistivity image or other suitable measurements to evaluate the fluid types of reservoir rocks.

In an embodiment of the disclosure, fractures are evaluated using a combination of one or more parameters relative to impedance and dielectric permittivity of the formation. After inversion, when the different unknown parameters have been uncovered, the image of at least a first parameter relative to resistivity (namely electrical impedivity and/or resistivity) and the image of at least a second parameter relative to dielectric permittivity is generated. In an embodiment, the second parameter is the dielectric permittivity of the formation taken at one frequency. In another embodiment the second parameter is based on the dielectric permittivity taken at two different frequencies including a difference between the dielectric permittivity taken at two different frequencies or a ratio of the dielectric permittivity taken at two different frequencies.

The method then includes identifying the fractures based on the image of the first parameter. Such fractures indeed appear as having a high resistivity or impedivity, in particular contrasting with the resistivity or impedivity of the neighbouring zones. However, the resistivity or impedivity image does not allow to discriminate open and closed fracture as both types of fractures have a similar signature on the resistivity (or impedivity) image. Such fracture identification may be provided by any appropriate means, including locating pixels of the image above a certain threshold and/or locating pixels of the image having high difference with at least a neighboring pixels. The location of pixels constituting the fracture may then be recorded.

The method then comprises determining the type of the fracture (i.e., whether the fractures are open, closed or partially closed) based on the dielectric permittivity related image. Indeed, the open fracture are filled with insulating oil-based mud while the closed fracture are mineral-filled. Oil-based mud has a low relative permittivity ($\varepsilon_r \cong 2$) whereas dry rock matrix have higher relative permittivity whatever the nature of the rock, varying from $\varepsilon_r \cong 3.6$ for sand stone to $\varepsilon_r \cong 9.0$ for carbonates, which will become even much larger in the presence of irreducible water. The mineral filling of the closed fractures shows a similar dielectric behavior as the dry rock matrix. In view of the above, the permittivity values shown on the permittivity image at the location where the fracture has been identified enables to derive the material filling the fracture and therefore the type of the fracture (open, partially closed or closed). This information may be obtained by comparing the value of the pixels identified as being part of the fracture to a threshold. Below a predetermined value (for instance $\varepsilon_r \cong 2.5$) the fracture location will be considered as filled with oil-based mud, hence open, and above this threshold, it will be considered as filled with dry matrix, i.e., closed. Such determination may happen at each of the fracture location. When a unique fracture has some open and some closed locations, it will be considered as partially closed.

In an alternative embodiment, as mentioned above, the parameter is the difference between two permittivity values taken at different frequencies. This also enables a robust determination. Indeed, the dielectric permittivity of the oil-based mud may be constant over a wide frequency range (in particular the MHz-frequency range, which is the operating range of the tool), while the dry matrix shows a strong dispersion, as it is a porous rock material: with increasing frequency the permittivity diminishes. Therefore, a difference between two images taken at two frequencies may differentiate the open fracture locations filled with borehole fluid (that will show a value close to zero) and the closed fracture locations filled with rock material, showing a non-zero value.

Such method may be performed by a user and/or by a processing system automatically determining the type of fractures based on zones indicated on the resistivity images by the user or automatically providing an identification of the fracture using any appropriate automation technique and then characterizing automatically the type of each fracture.

In another embodiment, the method includes deriving from the first and second parameter a third parameter. In particular the first parameter may be resistivity and the second parameter may be dielectric permittivity and the third parameter is a Hayman factor, that is defined as follows:

$$H_{ay} \equiv \frac{\varepsilon_{rock}}{A + B * f^C * R_{rock}^D} \quad \text{(Equation 13)}$$

wherein $\varepsilon_{rock}$ is the measured permittivity, $R_{rock}$ is the measured resistivity, f is the frequency and A, B, C and D are coefficients obtained empirically. An image of the third parameter may be generated as well. Based on the Hayman factor image, the method also comprises identifying a material of the wall of the wellbore on at least a predetermined location. Indeed, distinct behavior is observed for this Hayman factor depending on the material of the borehole wall. Porous rocks give values close to $H_{ay} \cong 1.0$. Oil-based-mud filtrate shows smaller values: $H_{ay} \leq 0.1$. Shaly zones and clays have far larger values: $H_{ay} \geq 1.5$. Therefore, applying a comparison of the Hayman factor image location (or pixel) with one or more threshold enables to discriminate the material of the borehole wall, in particular between the three categories above, i.e., oil-based mud, clays and porous rocks. This comparison can be made easily visible on the image by selecting a suitable rainbow scale to render these distinct material apart by color.

In this embodiment, fractures may also be identified using the image of the first parameter, i.e., resistivity, as explained above. Further, the type of the fracture may be determined using the Hayman factor image and the material discrimination that has been performed before. Indeed, as mentioned before, at each location (or pixel) of the identified fracture, when the material has been identified as oil-based mud, the fracture is considered as open, and when the material is porous rock, the fracture is considered as closed. When a unique fracture has some open and some closed locations, it will be considered as partially closed.

Figure 5:
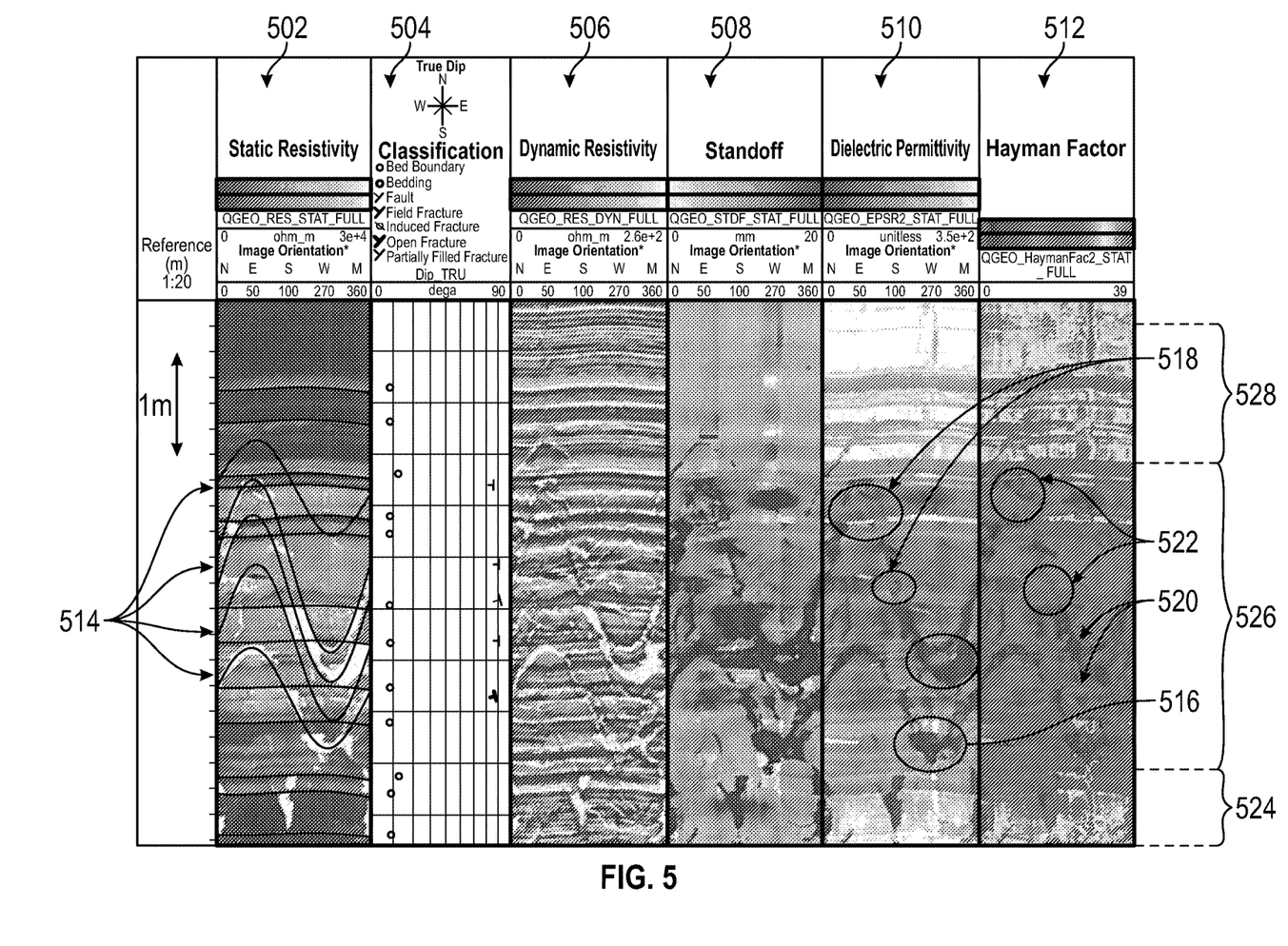
FIG. 5 is a graphical depiction of various output created by a formation imaging unit part of the system of FIG. 1

FIG. 5 shows an example of images 500 obtained from the tool that show identification of information of the geological formation. On FIG., the first track 502 shows the static resistivity of the formation, the second track 504 shows some geological features that are identified based on the formation layer information existed in track 501, the third track 506 shows the dynamic resistivity, the fourth track 508 shows the standoff, the fifth track 510 shows the dielectric permittivity and the track 512 shows the Hayman factor.

As can be seen on the static and dynamic resistivity, fractures 514 can be identified as zones with highest resistivity (lighter color on the static or dynamic resistivity charts). The dielectric permittivity track shows that at the locations of the fractures some zones 516 are darker, showing lower permittivity corresponding to oil-based mud, and indicating an open zone of the fractures, and some zones 518 are lighter, showing higher permittivity corresponding to rocks, and indicate a closed zone of the fractures. This is also visible on the Hayman factor track, wherein some zones 520 are purple, showing a lower Hayman factor, corresponding to oil-based mud indicating an open zone of the fracture while other zones 522 are blue, indicative of a higher Hayman factor and of a filling material corresponding to dry rock, flagging a closed zone of the fracture. Therefore, both tracks help identifying the type of the fractures, such fractures having both closed and open zones being partially closed fracture.

Further, the Hayman track and the permittivity track both highlight a difference between material constituting the borehole wall in different zones 524, 526, 528 of the wellbore wall enabling to have a first indication on the type of material present in the borehole wall.

Figure 6:
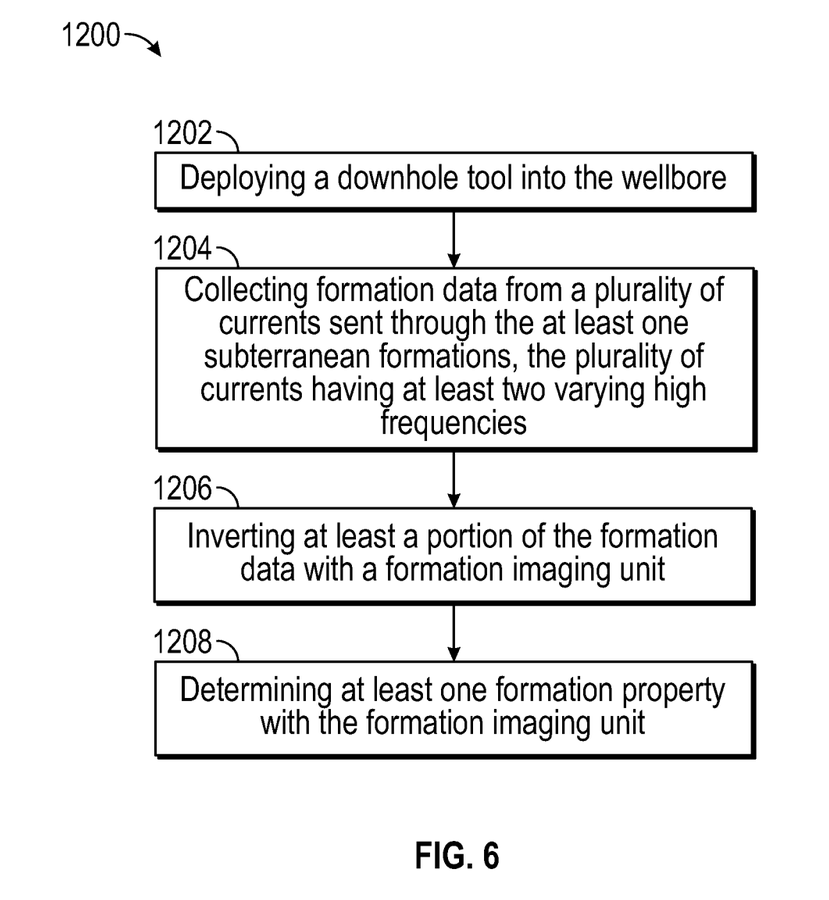
FIG. 6 is a flow chart depicting a method of characterizing properties of at least one subterranean formation, in accordance with embodiments of the present disclosure.

FIG. 6 depicts a flow diagram 1200 illustrating a method for determining properties of at least one subterranean formation 136 in the wellbore 106 (as shown in FIG. 1). The flow begins by deploying 1202 a downhole tool into the wellbore. The downhole tool may be any of the downhole tools described herein and may include one or more sensors 120. The flow continues by collecting 1204 formation data from a plurality of currents sent through the at least one subterranean formation, the plurality of currents having at least two varying, or different, high frequencies. The flow continues by inverting 1206 at least a portion of the formation data with a formation imaging unit and determining 1208 at least one formation property with the formation imaging unit. Inverting 1206 the formation data includes generating at least an image of a first parameter relative to resistivity and a second parameter relative to permittivity, optionally other parameters such a third parameter derived from the first and second and a fourth parameter such as standoff. As mentioned in details hereinabove, determining 1208 at least a property of the formation includes determining the material of the formation and/or identifying the fractures and characterizing the fracture types.

While the embodiments are described with reference to various implementations and exploitations, it will be understood that these embodiments are illustrative and that the scope of the inventive subject matter is not limited to them. Many variations, modifications, additions and improvements are possible. For example, additional sources and/or receivers may be located about the wellbore to perform seismic operations.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The disclosure relates to a method for determining properties of at least one subterranean formation in a wellbore at a wellsite and comprises deploying a downhole tool into the wellbore having a wall, the downhole tool having a formation sensor thereon; collecting at least two currents sent through the at least one subterranean formation from the formation sensor; and performing an inversion at the formation imaging unit based on formation data determined from the at least two currents. Performing the inversion comprises generating an image of at least a first parameter relative to resistivity of the formation and of at least a second parameter relative to dielectric permittivity of the formation.

The method also includes identifying a fracture of the wall of the wellbore and determining a type of the fracture using the images of the first and second parameters.

The method may comprise identifying the fracture based on the image of the first parameter, and determining the type of the fracture based on the image of the second parameter.

In an embodiment, the method comprises deriving an image from a third parameter based on the images of the first and second parameters and determining the type of the fracture based on the image of the third parameter. In particular, the first parameter may be resistivity, the second parameter may be dielectric permittivity and the third parameter may be an Hayman factor where:

$$H_{ay} \equiv \frac{\varepsilon_{rock}}{A + B * f^C * R_{rock}^D}$$

Wherein $\varepsilon_{rock}$ is the measured permittivity, $R_{rock}$ is the measured resistivity, f is the frequency and A, B, C and D are coefficients obtained empirically.

In an embodiment, determining the type of the fracture includes determining the material present at the location of the identified fracture.

In an embodiment, determining the type of the fracture includes comparing each location of the fracture on the image of the second parameter with at least one predetermined threshold.

In another embodiment, determining the type of the fracture includes comparing each location of the fracture on the image of the third parameter with at least one predetermined threshold.

The type of the fracture may be one of the following: open, closed or partially closed.

In an embodiment, the two currents are sent through the formation at least at two distinct frequencies. The two frequencies may be in a frequency range from 100 kHz to 100 Mhz, for instance the first frequency being in the 100 kHZ to 1 MHz range while the second frequency is in the 5 to 100 MHz range.

The method may also comprise performing an inversion at the formation imaging unit on the formation data to generate an image of at least a fourth parameter relative to standoff between the downhole tool and the formation.

In an embodiment, the first parameter comprises one or more of impedivity or resistivity of the formation.

In an embodiment, the second parameter is a dielectric permittivity of a formation at one predetermined frequency or is based on the dielectric permittivity at a first and a second predetermined frequencies, in particular a difference or a ratio of the permittivities at first and second predetermined frequencies.

The method may include determining formation data from the at least two collected currents. The images of the at least first and second parameters may be generated based on the formation data.

The method of claim 1 may also include determining mud data from the at least two collected currents and sending the determined mud data to the formation imaging unit.

The method also relates to a method for determining properties of at least one subterranean formation in a wellbore at a wellsite. The method comprises deploying a downhole tool into the wellbore having a wall, the downhole tool having a formation sensor thereon; and collecting at least two currents sent through the at least one subterranean formation from the formation sensor. The method also includes performing an inversion at the formation imaging unit based on formation data determined from the at least two currents. Performing the inversion comprises generating an image of at least a first parameter relative to resistivity of the formation and of at least a second parameter relative to dielectric permittivity of the formation. The method also includes identifying a material of the wall of the wellbore based at least on the second parameter on at least a predetermined location.

The method may also comprise deriving an image from a third parameter based on the first and second parameters and identifying a material of the wall of the wellbore based at least on the third parameter on at least a predetermined location. The first parameter may be resistivity, the second parameter may be dielectric permittivity and the third parameter may be an Hayman factor where:

$$H_{ay} \equiv \frac{\varepsilon_{rock}}{A + B * f^C * R_{rock}^D}$$

Wherein $\varepsilon_{rock}$ is the measured permittivity, $R_{rock}$ is the measured resistivity, f is the frequency and A, B, C and D are coefficients obtained empirically.

In an embodiment, identifying the material includes comparing at least one predetermined location of the image of the second parameter with at least one threshold. The material may be identified as one of the following materials: oil-based mud, porous rock matrix, and clays.

In an embodiment, the method includes identifying at least a fracture of the wall of the wellbore based on the image of the first parameter and determining the type of the fracture based on the identified material at each location of the fracture. The type of fracture may be determined as one of the following: open, closed or partially closed.

In particular, the type of the fracture is determined according to at least one of the following rules:
  The fracture is determined as being an open fracture when the identified material in each location of the fracture is oil-based mud,
  The fracture is determined as being a closed fracture when the identified material in each location of the fracture is porous rock matrix,
  The fracture is determined as being a partially closed fracture when the identified material varies from location of the fracture to the other.

The disclosure also relates to a system for determining properties of at least one subterranean formation in a wellbore at a wellsite comprising a downhole tool having a formation sensor thereon, wherein the formation sensor is configured to collect two currents sent through the at least one subterranean formation and to determine formation data from the at least two currents; and a formation imaging unit configured to perform an inversion based on formation data determined from the at least two currents. Performing the inversion comprises generating an image of at least a first parameter relative to resistivity of the formation and of at least a second parameter relative to dielectric permittivity of the formation. The formation imaging unit is also configured to identify a fracture of the wall of the wellbore and determining a type of the fracture using the images of the first and second parameters.

In an embodiment, the formation imaging is configured to determine the material present at the location of the identified fracture and use the type material present at the location of the identified fracture to determine the type of the fracture.

The disclosure also relates to a system for determining properties of at least one subterranean formation in a wellbore at a wellsite comprising a downhole tool having a formation sensor thereon, wherein the formation sensor is configured to collect two currents sent through the at least one subterranean formation and to determine formation data from the at least two currents; and a formation imaging unit. The formation imaging unit is configured to perform an inversion based on formation data determined from the at least two currents. Performing the inversion comprises generating an image of at least a first parameter relative to resistivity of the formation and of at least a second parameter relative to dielectric permittivity of the formation. The formation imaging unit is also configured to identify a material of the wall of the wellbore based at least on the second parameter on at least a predetermined location.

What is claimed is:

1. A method for determining properties of at least one subterranean formation in a wellbore at a wellsite, the method comprising:
    deploying a downhole tool into the wellbore having a wall with an oil-based mud column coated thereon, the downhole tool having a formation sensor thereon;
    collecting at least two currents sent through the mud column and the at least one subterranean formation from the formation sensor;
    performing an inversion at the formation imaging unit based on formation data determined from the at least two currents, wherein performing the inversion comprises generating an image of at least a first parameter relative to resistivity of the formation and of at least a second parameter relative to dielectric permittivity of the formation;
    identifying a fracture of the wall of the wellbore and determining a type of the fracture using the images of the first and second parameters by determining the material present at the location of the identified fracture utilizing the second parameter,
    wherein the type of the fracture may be one of the following: open, closed or partially closed, and
    wherein an open fracture is determined to be filled with an oil-based mud material, wherein a closed fracture has been determined to be filled with a dry rock matrix, and wherein the partially closed fracture is determined to be partially filled with the oil-based mud material.

2. The method of claim 1, wherein it comprises:
    Identifying the fracture based on the image of the first parameter,
    Determining the type of the fracture based on the image of the second parameter.

3. The method of claim 1, comprising deriving an image from a third parameter based on the images of the first and second parameters and determining the type of the fracture based on the image of the third parameter.

4. The method of claim 3, wherein the first parameter is resistivity, the second parameter is dielectric permittivity and the third parameter is an Hayman factor where:

$$H_{ay} \equiv \frac{\varepsilon_{rock}}{A + B * f^C * R_{rock}^D}$$

Wherein $\varepsilon_{rock}$ is the measured permittivity, $R_{rock}$ is the measured resistivity, f is the frequency and A, B, C and D are coefficients obtained empirically.

5. The method of claim 2, wherein determining the type of the fracture includes comparing each location of the fracture on the image of the second parameter with at least one predetermined threshold.

6. The method of claim 3, wherein determining the type of the fracture includes comparing each location of the fracture on the image of the third parameter with at least one predetermined threshold.

7. The method of claim 1, wherein the two currents are sent through the formation at least at two distinct frequencies.

8. The method of claim 1, wherein the first parameter comprises one or more of impedivity or resistivity of the formation and wherein the second parameter is a dielectric permittivity of a formation at one predetermined frequency or is based on the dielectric permittivity at a first and a second predetermined frequencies.

9. A method for determining properties of at least one subterranean formation in a wellbore at a wellsite, the method comprising:
    deploying a downhole tool into the wellbore having a wall with an oil-based mud standoff coated on the wellbore wall, the downhole tool having a formation sensor thereon;
    collecting at least two currents sent through the mud standoff and the at least one subterranean formation from the formation sensor;
    performing an inversion at the formation imaging unit based on formation data determined from the at least two currents, wherein performing the inversion comprises generating an image of at least a first parameter relative to resistivity of the formation and of at least a second parameter relative to dielectric permittivity of the formation; and
    identifying a material of the wall of the wellbore based at least on the second parameter on at least a predetermined location, wherein the material is identified as one of the following materials: the oil-based mud, a porous rock matrix, and a clay based on the determined second parameters.

10. The method of claim 9, wherein it comprises deriving an image from a third parameter based on the first and second parameters and identifying a material of the wall of the wellbore based at least on the third parameter on at least a predetermined location.

11. The method of claim 10, wherein the first parameter is resistivity, the second parameter is dielectric permittivity and the third parameter is an Hayman factor where:

$$H_{ay} \equiv \frac{\varepsilon_{rock}}{A + B * f^C * R_{rock}^D}$$

Wherein $\varepsilon_{rock}$ is the measured permittivity, $R_{rock}$ is the measured resistivity, f is the frequency and A, B, C and D are coefficients obtained empirically.

12. The method of claim 9, wherein identifying the material includes comparing at least one predetermined location of the image of the second parameter with at least one threshold.

13. The method of claim 9, including identifying at least a fracture of the wall of the wellbore based on the image of the first parameter and determining the type of the fracture based on the identified material at each location of the fracture.

14. The method of claim 13, wherein the type of the fracture is determined as one of the following: open, closed or partially closed.

15. The method of claim 13, wherein the type of the fracture is determined according to at least one of the following rules:
   The fracture is determined as being an open fracture when the identified material in each location of the fracture is oil-based mud,
   The fracture is determined as being a closed fracture when the identified material in each location of the fracture is porous rock matrix,
   The fracture is determined as being a partially closed fracture when the identified material varies from location of the fracture to the other.

16. A system for determining properties of at least one subterranean formation in a wellbore having a wall with an oil-based mud column coated on the wellbore wall at a wellsite comprising:
   a downhole tool having a formation sensor thereon, wherein the formation sensor is configured to collect two currents sent through the mud column and the at least one subterranean formation and to determine formation data from the at least two currents; and
   a formation imaging unit configured to:
      perform an inversion based on formation data determined from the at least two currents, wherein performing the inversion comprises generating an image of at least a first parameter relative to resistivity of the formation and of at least a second parameter relative to dielectric permittivity of the formation; and
      identify a fracture of the wall of the wellbore and determining a type of the fracture based on the presence of the oil-based mud in the fracture using the images of the first and second parameters.

17. The system of claim 16, wherein the formation imaging is configured to determine the material present at the location of the identified fracture and use the type material present at the location of the identified fracture to determine the type of the fracture.

* * * * *